United States Patent
Cosgrove et al.

(10) Patent No.: US 11,014,437 B2
(45) Date of Patent: May 25, 2021

(54) HYBRID ELECTRIC VEHICLE BATTERY CHARGE REDUCTION FOR IMPROVED COOLING PERFORMANCE

(71) Applicant: TOYOTA MOTOR ENGINEERING & MANUFACTURING NORTH AMERICA, INC., Plano, TX (US)

(72) Inventors: David W. Cosgrove, Royal Oak, MI (US); Luis Carlos Quinteros Torres, Ann Arbor, MI (US); Hidekazu Hirabayashi, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 243 days.

(21) Appl. No.: 16/127,135

(22) Filed: Sep. 10, 2018

(65) Prior Publication Data

US 2020/0079203 A1    Mar. 12, 2020

(51) Int. Cl.
*B60K 6/22*     (2007.10)
*B60L 58/12*    (2019.01)
*B60L 58/26*    (2019.01)
*H02J 7/00*     (2006.01)
*B60L 53/14*    (2019.01)

(52) U.S. Cl.
CPC .............. *B60K 6/22* (2013.01); *B60L 53/14* (2019.02); *B60L 58/12* (2019.02); *B60L 58/26* (2019.02); *H02J 7/0027* (2013.01)

(58) Field of Classification Search
CPC . B60K 6/22; B60L 53/14; B60L 58/12; B60L 58/26; H02J 7/0027
See application file for complete search history.

(56) References Cited

U.S. PATENT DOCUMENTS

| 6,098,734 A * | 8/2000 | Kawamura ........... B60W 10/08 180/65.245 |
| 6,232,748 B1 | 5/2001 | Kinoshita |
| 2008/0203975 A1 | 8/2008 | Burlak |
| 2010/0156355 A1 | 6/2010 | Bauerle |
| 2012/0200257 A1 | 8/2012 | Schwarz |
| 2013/0197730 A1 * | 8/2013 | Huntzicker ............. B60L 11/16 701/22 |

(Continued)

*Primary Examiner* — Bryan A Evans
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for vehicle battery charge reduction. A hybrid electric vehicle is disclosed. The vehicle comprises an internal combustion engine; an electric motor; a battery electrically coupled to the electric motor; a battery charger electrically coupled to the battery and mechanically coupled to the internal combustion engine; one or more sensors, wherein each sensor provides a respective sensor signal, wherein each sensor signal represents a respective current operating condition of the hybrid electric vehicle; and a computing component configured to: perform a first comparison of a state-of-charge of the battery to a charge threshold, perform a second comparison of one or more of the current vehicle operating conditions to respective nominal vehicle operating conditions, wherein none of the vehicle operating conditions describe a condition of the battery, and reduce charging of the battery based on the first comparison and the second comparison.

21 Claims, 6 Drawing Sheets

(56) References Cited

U.S. PATENT DOCUMENTS

2015/0105213 A1\* 4/2015 Wright ................. B60W 20/40
477/3
2016/0023567 A1 1/2016 Lee \* cited by examiner

HYBRID ELECTRIC VEHICLE BATTERY CHARGE REDUCTION FOR IMPROVED COOLING PERFORMANCE

TECHNICAL FIELD

The present disclosure relates generally to hybrid vehicles. In particular, embodiments of the present disclosure relate to charging the battery of a hybrid vehicle.

DESCRIPTION OF RELATED ART

Hybrid vehicles have become increasingly popular among consumers concerned with environmental impact and fuel economy. Hybrid vehicles generally utilize an engine, e.g., an internal combustion engine, along with an electric motor powered by an on-board battery. When the battery charge runs low, the battery may be recharged by engine power, regenerative brakes, solar panels, and the like. When the battery is sufficiently charged, the electric motor may then provide power to the wheels so that under certain driving conditions, the hybrid vehicle may even run solely on the electric motor.

BRIEF SUMMARY OF THE DISCLOSURE

According to various embodiments of the disclosed technology, battery charging for a hybrid electric vehicle (HEV) is reduced, resulting in improved cooling performance. The HEV includes an internal combustion engine; an electric motor; a battery electrically coupled to the electric motor, a battery charger electrically coupled to the battery and mechanically coupled to the internal combustion engine, and one or more sensors. Each sensor provides a respective sensor signal. Each sensor signal represents a respective current operating condition of the HEV. None of the vehicle operating conditions describe a condition of the battery.

The HEV also includes a computing component. The computing component performs a first comparison of a state-of-charge of the battery to a charge threshold, performs a second comparison of one or more of the current vehicle operating conditions to respective nominal vehicle operating conditions, and reduces charging of the battery based on the first comparison and the second comparison.

In general, one aspect disclosed features hybrid electric vehicle, comprising: an internal combustion engine; an electric motor; a battery electrically coupled to the electric motor; a battery charger electrically coupled to the battery and mechanically coupled to the internal combustion engine; one or more sensors, wherein each sensor provides a respective sensor signal, wherein each sensor signal represents a respective current operating condition of the hybrid electric vehicle; and a computing component configured to: perform a first comparison of a state-of-charge of the battery to a charge threshold, perform a second comparison of one or more of the current vehicle operating conditions to respective nominal vehicle operating conditions, wherein none of the vehicle operating conditions describe a condition of the battery, and reduce charging of the battery based on the first comparison and the second comparison.

Embodiments of the vehicle may include one or more of the following features. In some embodiments, the computing component is further configured to: reduce charging of the battery responsive to (i) the state-of-charge of the battery being below a charge threshold, and (ii) one or more of the current vehicle operating conditions being outside a normal range. In some embodiments, the second comparison comprises: comparing the one or more current vehicle operating conditions to one or more respective vehicle operating conditions thresholds. In some embodiments, the one or more current vehicle operating conditions comprise: an ambient temperature near the hybrid electric vehicle; a throttle angle of an internal combustion engine of the hybrid electric vehicle; a temperature of the internal combustion engine; and a temperature of a transmission of the hybrid electric vehicle; a load of the internal combustion engine; and a road grade encountered by the hybrid electric vehicle. In some embodiments, the second comparison comprises: determining whether the vehicle is in a tow mode. In some embodiments, to reduce charging of the battery, the computing component is further configured to: reduce a target state of charge; reduce a time of charging the battery; reduce a number of charging intervals of the battery; reduce a length of the charging intervals of the battery; reduce a rate of charging the battery; and reduce a minimum charge threshold. In some embodiments, the computing component is further configured to: performing a third comparison of one of the current vehicle operating conditions to a plurality of vehicle operating conditions thresholds; selecting one of a plurality of charging modes based on the third comparison; and reducing charging of the battery according to the selected charging mode.

In general, one aspect disclosed features a non-transitory machine-readable storage medium encoded with instructions executable by a hardware processor of a computing component of a hybrid vehicle, the machine-readable storage medium comprising instructions to cause the hardware processor to: perform a first comparison of a state-of-charge of a battery of the hybrid vehicle to a charge threshold; perform a second comparison of one or more current vehicle operating conditions to respective nominal vehicle operating conditions, wherein none of the vehicle operating conditions describe a condition of the battery; and reduce charging of the battery based on the first comparison and the second comparison.

Embodiments of the non-transitory machine-readable storage medium may include one or more of the following features. Some embodiments comprise reducing charging of the battery responsive to (i) the state-of-charge of the battery being below a charge threshold, and (ii) one or more of the current vehicle operating conditions being outside a normal range. In some embodiments, the second comparison comprises: comparing the one or more current vehicle operating conditions to one or more respective vehicle operating conditions thresholds. In some embodiments, the one or more current vehicle operating conditions comprise: an ambient temperature near the hybrid electric vehicle; a throttle angle of an internal combustion engine of the hybrid electric vehicle; a temperature of the internal combustion engine; and a temperature of a transmission of the hybrid electric vehicle; a load of the internal combustion engine; and a road grade encountered by the hybrid electric vehicle. In some embodiments, the second comparison comprises: determining whether the vehicle is in a tow mode. In some embodiments, reducing charging of the battery comprises at least one of: reducing a target state of charge; reducing a time of charging the battery; reducing a number of charging intervals of the battery; reducing a length of the charging intervals of the battery; reducing a rate of charging the battery; and reducing a minimum charge threshold. Some embodiments comprise performing a third comparison of one of the current vehicle operating conditions to a plurality of vehicle operating conditions thresholds; selecting one of a plurality of charging modes based on the third comparison; and reducing charging of the battery according to the selected charging mode.

In general, one aspect disclosed features a method for a hybrid electric vehicle, comprising: performing a first comparison of a state-of-charge of a battery of the hybrid vehicle to a charge threshold; performing a second comparison of one or more current vehicle operating conditions to respective nominal vehicle operating conditions, wherein none of the vehicle operating conditions describe a condition of the battery; and reducing charging of the battery based on the first comparison and the second comparison.

Embodiments of the method may include one or more of the following features. Some embodiments comprise reducing charging of the battery responsive to (i) the state-of-charge of the battery being below a charge threshold, and (ii) one or more of the current vehicle operating conditions being outside a normal range. In some embodiments, the second comparison comprises: comparing the one or more current vehicle operating conditions to one or more respective vehicle operating conditions thresholds. In some embodiments, wherein the one or more current vehicle operating conditions comprise: an ambient temperature near the hybrid electric vehicle; a throttle angle of an internal combustion engine of the hybrid electric vehicle; a temperature of the internal combustion engine; and a temperature of a transmission of the hybrid electric vehicle; a load of the internal combustion engine; and a road grade encountered by the hybrid electric vehicle. In some embodiments, the second comparison comprises: determining whether the vehicle is in a tow mode. In some embodiments, reducing charging of the battery comprises at least one of: reducing a target state of charge; reducing a time of charging the battery; reducing a number of charging intervals of the battery; reducing a length of the charging intervals of the battery; reducing a rate of charging the battery; and reducing a minimum charge threshold. Some embodiments comprise performing a third comparison of one of the current vehicle operating conditions to a plurality of vehicle operating conditions thresholds; selecting one of a plurality of charging modes based on the third comparison; and reducing charging of the battery according to the selected charging mode.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments are directed to reducing charging of a hybrid vehicle's high-voltage battery for improved cooling performance.

For convenience, in this disclosure internal combustion engines are referred to as "engines" and electric motors are referred to as "motors." An engine generally includes a cooling system to reject the excess heat produced by the engine. Coolant is circulated through passages in the engine to absorb excess heat, and then flows through a radiator to shed the excess heat. In conventional vehicles the levels of excess heat vary with the load placed upon the engine. In hybrid vehicles excess heat is generated not only by the internal combustion engine, but also through charging the vehicle battery. According to various embodiments, the charging of the vehicle battery is reduced under certain circumstances, thereby reducing the amount of excess heat generated and improving cooling performance.

The reduced battery charging provided by various embodiments disclosed herein may also lead to other performance enhancements in various applications. Reducing battery charging generally reduces the load torque placed on the engine, reduces the engine temperature, reduces the HV water temperature, reduces the transmission temperature, limits the inverter temperature, and reduces the exhaust gas temperature. These temperature reductions may also lead to reduced heat damage to parts surrounding these elements, particularly those surrounding the exhaust system and may also improve towing capacity. Lower engine operating temperatures may also allow an increased area for undercovers, such as air dams and the like underneath the vehicle, to reduce drag and thereby increase fuel economy.

New turbo engines have increased heat load at high engine load and require additional cooling capacity. This requirement is usually satisfied by adding cooling heat exchangers or increasing their size. Disadvantages of this approach include requiring a larger vehicle package and reducing crumple zones, thereby posing a greater risk to pedestrians. Various disclosed embodiments reduce or eliminate the need for additional or larger cooling heat exchangers to improve packaging and safety.

Figure 1:
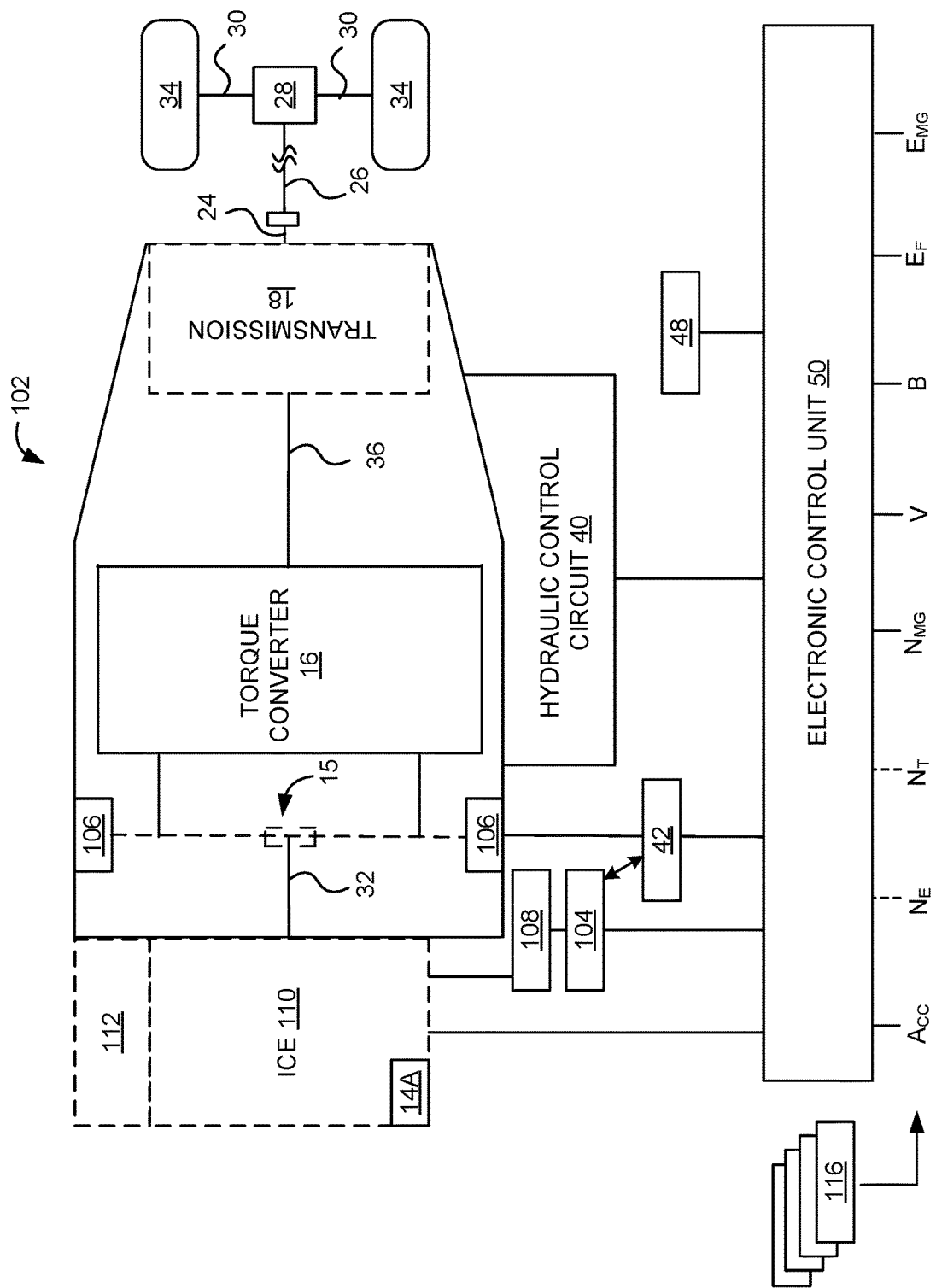
FIG. 1 depicts elements of a hybrid vehicle according to some embodiments.

An example hybrid electric vehicle (HEV) in which embodiments of the disclosed technology may be implemented is illustrated in FIG. 1. FIG. 1 illustrates a drive system of a vehicle 102 that may include an internal combustion engine 110 and one or more electric motors 106 (which may also serve as generators) as sources of motive power. Driving force generated by the internal combustion engine 110 and motor 106 can be transmitted to one or more wheels 34 via a torque converter 16, a transmission 18, a differential gear device 28, and a pair of axles 30.

As an HEV, vehicle 102 may be driven/powered with either or both of engine 110 and the motor(s) 106 as the drive source for travel. For example, a first travel mode may be an engine-only travel mode that only uses internal combustion engine 110 as the drive source for travel. A second travel mode may be an EV travel mode that only uses the motor(s) 106 as the drive source for travel. A third travel mode may be an HEV travel mode that uses engine 110 and the motor(s) 106 as drive sources for travel. In the engine-only and HEV travel modes, vehicle 102 relies on the motive force generated at least by internal combustion engine 110, and a clutch 15 may be included to engage engine 110. In the EV travel mode, vehicle 102 is powered by the motive force generated by motor 106 while engine 110 may be stopped and clutch 15 disengaged.

Engine 110 can be an internal combustion engine such as a spark ignition (SI) engine (e.g., gasoline engine) a compression ignition (CI) engine (e.g., diesel engine) or similarly powered engine (whether reciprocating, rotary, continuous combustion or otherwise) in which fuel is injected into and combusted to provide motive power. A cooling system 112 can be provided to cool the engine such as, for example, by removing excess heat from engine 110. For example, cooling system 112 can be implemented to include a radiator, a water pump and a series of cooling channels. In operation, the water pump circulates coolant through the engine to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 110. In other applications, either or both the water pump and the fan may be operated by electric current such as from battery 104.

An output control circuit 14A may be provided to control drive (output torque) of engine 110. Output control circuit 14A may include a throttle actuator to control an electronic throttle valve that controls fuel injection, an ignition device that controls ignition timing, and the like. Output control circuit 14A may execute output control of engine 110 according to a command control signal(s) supplied from an electronic control unit 50, described below. Such output control can include, for example, throttle control, fuel injection control, and ignition timing control.

Motor 106 can also be used to provide motive power in vehicle 102, and is powered electrically via a battery 104. Battery 104 may be implemented as one or more batteries or other power storage devices including, for example, lead-acid batteries, lithium ion batteries, capacitive storage devices, and so on. Battery 104 may be charged by a battery charger 108 that receives energy from internal combustion engine 110. For example, an alternator or generator may be coupled directly or indirectly to a drive shaft of internal combustion engine 110 to generate an electrical current as a result of the operation of internal combustion engine 110. A clutch can be included to engage/disengage the battery charger 108. Battery 104 may also be charged by motor 106 such as, for example, by regenerative braking or by coasting during which time motor 106 operate as generator.

Motor 106 can be powered by battery 104 to generate a motive force to move the vehicle and adjust vehicle speed. Motor 106 can also function as a generator to generate electrical power such as, for example, when coasting or braking. Battery 104 may also be used to power other electrical or electronic systems in the vehicle. Motor 106 may be connected to battery 104 via an inverter 42. Battery 104 can include, for example, one or more batteries, capacitive storage units, or other storage reservoirs suitable for storing electrical energy that can be used to power motor 106. When battery 104 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 106, and adjust the current received from motor 106 during regenerative coasting and breaking. As a more particular example, output torque of the motor 106 can be increased or decreased by electronic control unit 50 through the inverter 42.

A torque converter 16 can be included to control the application of power from engine 110 and motor 106 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 110 from the drivetrain of the vehicle. In the illustrated example, a crankshaft 32, which is an output member of engine 110, may be selectively coupled to the motor 106 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 110 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 110 (engine RPM), a rotational speed, $N_{MG}$, of the motor 106 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 104 detected by an SOC sensor). Accordingly, vehicle 102 can include a plurality of sensors 116 that can be used to detect various conditions internal or external to the vehicle and provide sensed conditions to engine control unit 50 (which, again, may be implemented as one or a plurality of individual control circuits). In one embodiment, sensors 116 may be included to detect one or more conditions directly or indirectly such as, for example, fuel efficiency, $E_F$, motor efficiency, $E_{MG}$, hybrid (internal combustion engine 110+MG 12) efficiency, etc.

In some embodiments, one or more of the sensors 116 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 116 may provide an analog output or a digital output.

Sensors 116 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
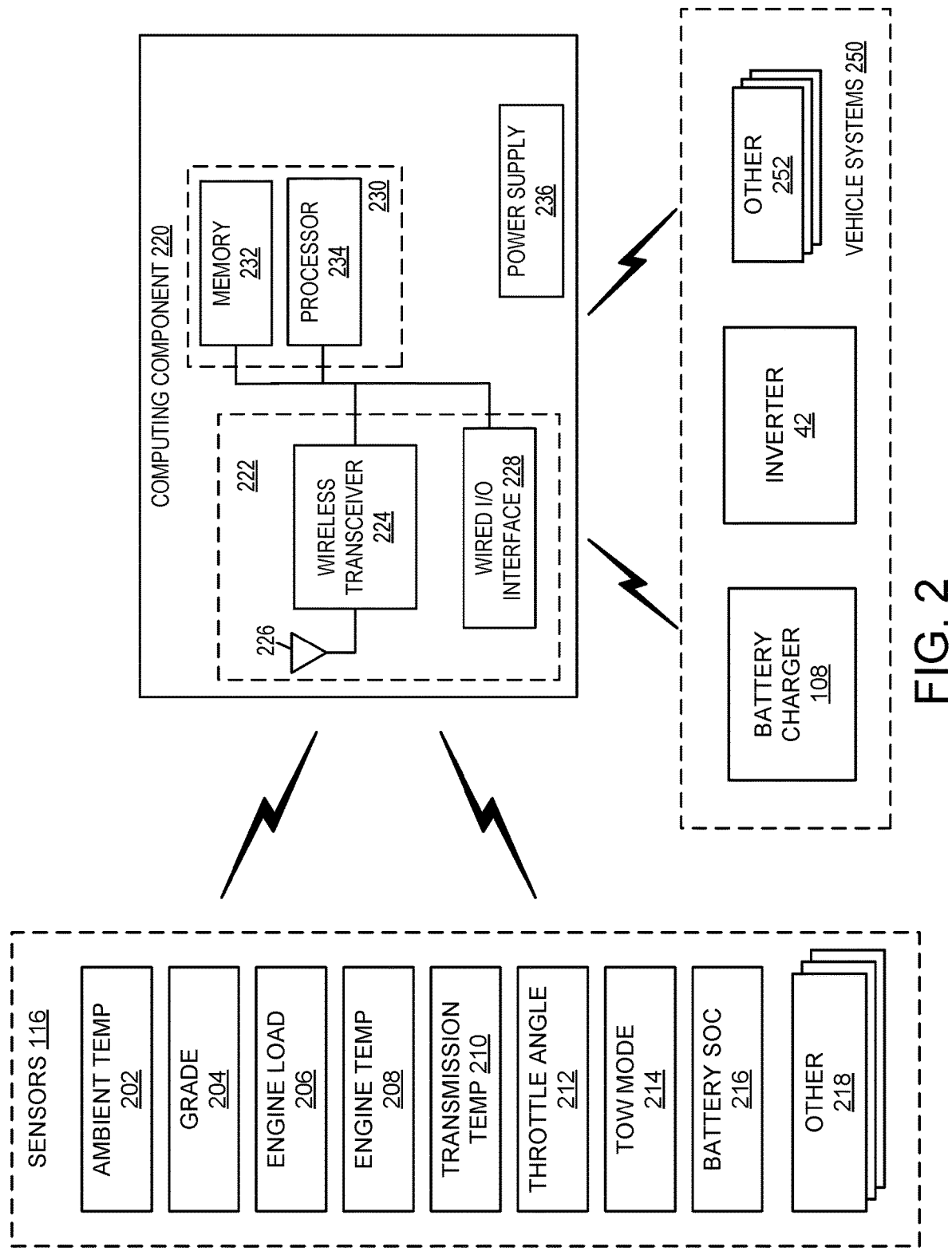
FIG. 2 shows further detail of the vehicle of FIG. 1 according to some embodiments.

FIG. 2 shows further detail of the HEV of FIG. 1 according to some embodiments. In the illustrated example the sensors 116 include an ambient temperature sensor 202, a grade sensor 204, an engine load sensor 206, an engine temperature sensor 208, a transmission temperature sensor 210, a throttle angle sensor 212, and a tow mode sensor 214. Each of these sensors 116 may generate a signal representing a respective operating condition of the vehicle 102. The sensors 116 also include a battery state of charge (SOC) sensor 216, and may include other sensors 218. Various embodiments may employ all of the sensors 116, a subset thereof, other sensors, or any combination thereof.

A computing component 220 may be included with the vehicle 102 to monitor the sensor data and other data, and to adjust the amount of battery charging in accordance with current vehicle operating parameters. For example, based on operating conditions, the computing component 220 may determine that nominal battery charging may be reduced. In some embodiments, the computing component 220 may be implemented as part of electronic control unit 50 or other like control units in the vehicle 102. In other embodiments, the computing component 220 may be a dedicated computing component that may include one or more processors or other circuitry to perform the computing component functions.

Referring again to FIG. 2, computing component 220 includes a processing circuit 230 that may include a processor 232 and a memory 234. The computing component 220 may include a power supply 250.

The computing component 220 may include a communications circuit 222. The communications circuit 222 may include a wireless transceiver 224 coupled with an antenna 226 for wireless communications with sensors 116 and/or vehicle systems 250. The communications circuit 222 may include a wired input/output (I/O) interface 228 for wired communications with sensors 116 and/or vehicle systems 250. Vehicle systems 250 in communication with the computing component 220 may include the battery charger 108 and the inverter 42, as well as other vehicle systems 252.

Figure 3:
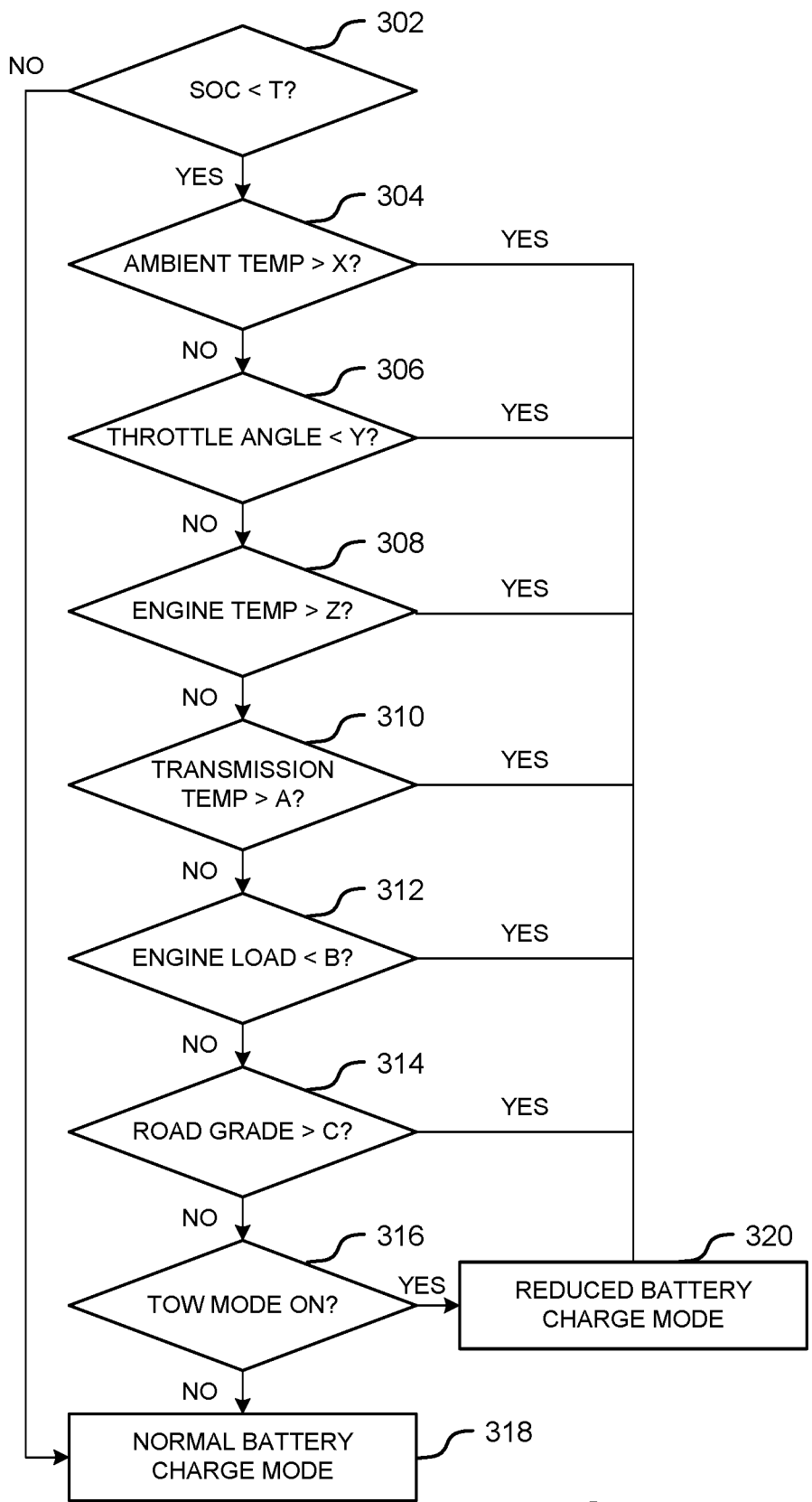
FIG. 3 is a flow chart illustrating example operations that may be performed by the computing component of the vehicle to reduce battery charging in accordance with current vehicle operating parameters.

FIG. 3 is a flow chart illustrating example operations that may be performed by the computing component of a vehicle (e.g., vehicle 102) to reduce battery charging in accordance with current vehicle operating parameters. In various embodiments, battery charging is reduced when the state-of-charge of the battery is below a charge threshold, and one or more of the current vehicle operating conditions is outside a normal range. Whether each current vehicle operating condition is outside a normal range may be determined by comparing the current vehicle operating condition with a respective vehicle operating condition threshold. In FIG. 3, operations 304 through 316 are presented in a particular sequence. However, it should be understood that these operations may be performed in other sequences, in parallel, or in any combination thereof.

At operation 302, the computing component determines whether the state of charge (SOC) of the battery 104 is less than a charging threshold T. In particular, the computing component receives a signal from the battery SOC sensor 216 that represents the state of charge of the battery 104. The state of charge of the battery 104 and the charging threshold T may be represented in a number of ways, for example as a voltage value. It should be appreciated that other ways may be used instead or in addition to that way. If the state of charge is not less than the charging threshold T, then at operation 318 the computing component enters or remains in normal battery charge mode.

But if at operation 302 the state of charge is below the charging threshold T, then at operation 304 the computing component compares the ambient temperature to an ambient temperature threshold X. In particular, the computing component receives a signal from ambient temperature sensor 202 that represents the ambient temperature near the vehicle 102. Increasing values of ambient temperature are correlated with reduced heat rejection. If the ambient temperature exceeds the ambient temperature threshold X, then at operation 320 the computing component enters or remains in a reduced battery charge mode.

The reduced battery charge mode may include one or more charging parameters having values that differ from those of the normal battery charge mode. For example, a time of charging the battery may be reduced. The number of charging intervals may be reduced. The duration of the charging intervals may be reduced. The rate of charging may be reduced. The value of a minimum charging threshold may be reduced. The target state of charge, meaning the state of charge to which the battery 104 will be charged, may be reduced. Any combination of these changes, and other changes, may be employed to implement the reduced battery charge mode. The computing component employs the selected battery charge mode to control charging of the battery 104 through battery charger 108.

But if at operation 304 the ambient temperature does not exceed the ambient temperature threshold X, then at operation 306 the computing component compares the throttle angle to a throttle angle threshold Y. In particular, the computing component receives a signal from throttle angle sensor 212 that represents the throttle angle of the vehicle 102. Increasing values of throttle angle are correlated with increased heat generation. If the throttle angle exceeds the throttle angle threshold Y, then at operation 320 the computing component enters or remains in the reduced battery charge mode.

But if at operation 306 the throttle angle does not exceed the throttle angle threshold Y, then at operation 308 the computing component compares the temperature of the engine 110 to an engine temperature threshold Z. In particular, the computing component receives a signal from engine temperature sensor 208 that represents the engine temperature of the vehicle 102. Increasing values of engine temperature are correlated with increased heat generation. If the engine temperature exceeds the engine temperature threshold Z, then at operation 320 the computing component enters or remains in the reduced battery charge mode.

But if at operation 308 the engine temperature does not exceed the engine temperature threshold Z, then at operation 310 the computing component compares the transmission temperature to a transmission temperature threshold A. In particular, the computing component receives a signal from transmission temperature sensor 210 that represents the transmission temperature of the vehicle 102. Increasing values of transmission temperature are correlated with increased heat generation. If the transmission temperature exceeds the transmission temperature threshold A, then at operation 320 the computing component enters or remains in the reduced battery charge mode.

But if at operation 310 the transmission temperature does not exceed the transmission temperature threshold A, then at operation 312 the computing component compares the engine load to an engine load threshold B. In particular, the computing component receives a signal from engine load sensor 206 that represents the engine load of the vehicle 102. Increasing values of engine load are correlated with increased heat generation. If the engine load exceeds the engine load threshold Y, then at operation 320 the computing component enters or remains in the reduced battery charge mode.

But if at operation 312 the engine load does not exceed the engine load threshold B, then at operation 314 the computing component compares the road grade to a road grade threshold C. In particular, the computing component receives a signal from grade sensor 204 that represents the road grade experienced by the vehicle 102. Increasing values of road grade are correlated with increasing steepness of the climb experienced by the vehicle 102, and with increased heat generation. If the road grade exceeds the road grade threshold C, then at operation 320 the computing component enters or remains in the reduced battery charge mode.

But if at operation 314 the road grade does not exceed the road grade threshold C, then at operation 316 the computing component determines whether a tow mode is on for the vehicle 102. In particular, the computing component receives a signal from tow mode sensor 214 that represents whether the vehicle 102 is in tow mode. Tow mode is correlated with increased heat generation. If the vehicle 102 is in tow mode, then at operation 320 the computing component enters or remains in the reduced battery charge mode. But if at operation 316 the vehicle 102 is not in tow mode, then at operation 318 the computing component enters or remains in the normal battery charge mode.

Figure 4:
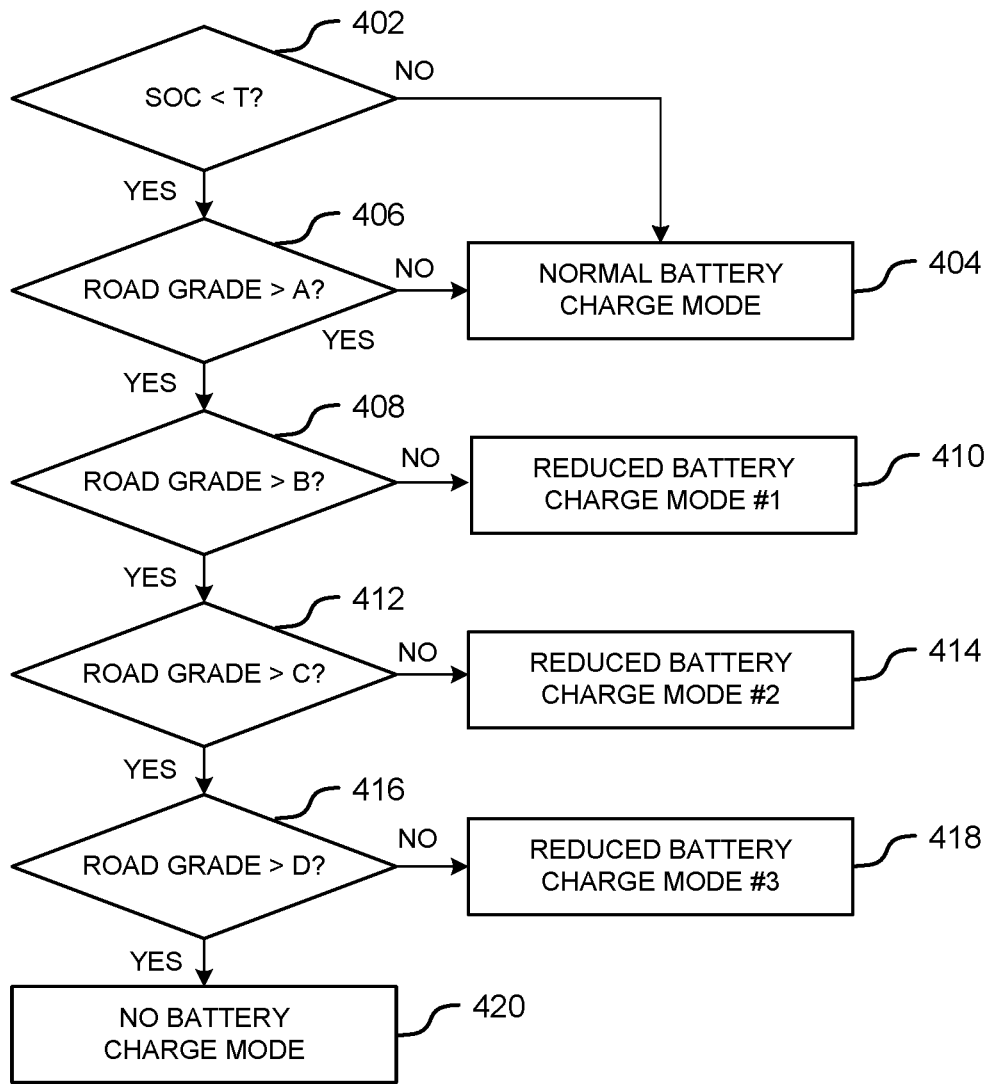
FIG. 4 is a flow chart illustrating example operations that may be performed by the computing component of the vehicle to reduce battery charging in accordance with several different threshold values for an operating parameter of the vehicle and corresponding reduced battery charge modes.

FIG. 4 is a flow chart illustrating example operations that may be performed by the computing component of the vehicle 102 to reduce battery charging in accordance with several different threshold values for an operating parameter of the vehicle and corresponding reduced battery charge modes. In the example of FIG. 4, the operating parameter of vehicle is road grade. However, it will be understood that FIG. 4 could be used for any vehicle operating parameter, or combinations of vehicle operating parameters. In FIG. 4, operations 404 through 418 are presented in a particular sequence. However, it should be understood that these operations may be performed in other sequences, in parallel, or in any combination thereof.

In the example of FIG. 4, the road grade thresholds are presented in order of increasing magnitude. For example, road grade threshold B represents a steeper climb than road grade threshold A. The battery charge modes are presented in order of greater reductions in battery charge. For example, reduced battery charge mode #2 represents a greater reduction in battery charge than reduced battery charge mode #1.

At operation 402, the computing component determines whether the state of charge (SOC) of the battery 104 is less than a charging threshold T. If the state of charge is not less than the charging threshold T, then at operation 404 the computing component enters or remains in normal battery charge mode. But if at operation 402 the state of charge is below the charging threshold T, that at operation 406 the computing component compares the road grade to a road grade threshold A. If at operation 406 the road grade does not exceed the road grade threshold A, then at operation 404 the computing component enters or remains in normal battery charge mode.

However, if at operation 406 the road grade exceeds the road grade threshold A, then at operation 408 the computing component compares the road grade to a second road grade threshold B. If at operation 408 the road grade does not exceed the road grade threshold B, then at operation 410 the computing component enters or remains in a first reduced battery charge mode (#1).

However, if at operation 408 the road grade exceeds the road grade threshold B, then at operation 412 the computing component compares the road grade to a third road grade threshold C. If at operation 412 the road grade does not exceed the road grade threshold C, then at operation 414 the computing component enters or remains in a second reduced battery charge mode (#2).

However, if at operation 412 the road grade exceeds the road grade threshold C, then at operation 416 the computing component compares the road grade to a fourth road grade threshold D. If at operation 416 the road grade does not exceed the road grade threshold D, then at operation 418 the computing component enters or remains in a third reduced battery charge mode (#3).

However, if at operation 418 the road grade exceeds the road grade threshold D, then at operation 420 the computing component enters or remains in a no battery charge mode. In the no battery charge mode, battery charging is suspended until the relevant current vehicle operating conditions improve.

Figure 5:
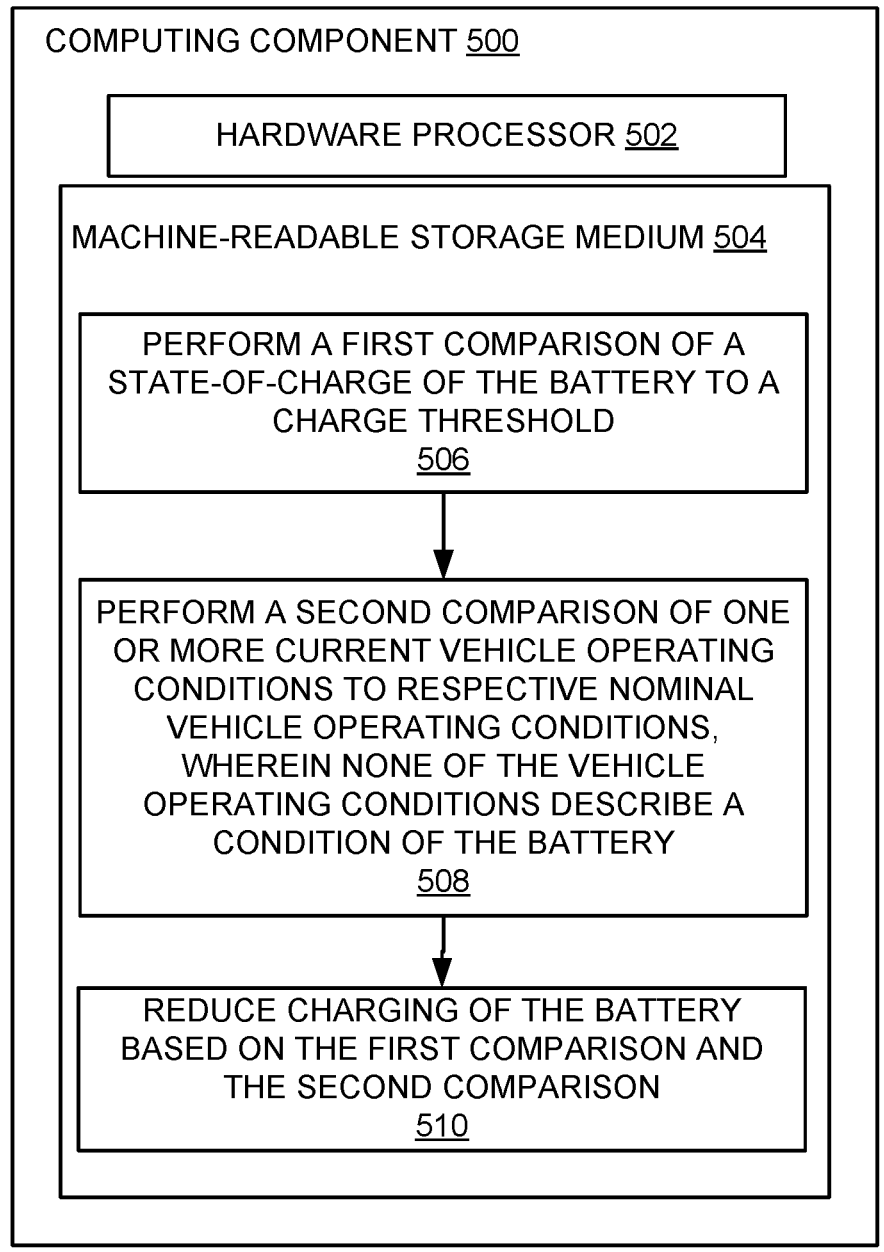
FIG. 5 is a block diagram of an example computing component or device for reducing battery charging in a hybrid vehicle in accordance with one embodiment.

FIG. 5 is a block diagram of an example computing component or device 500 for reducing battery charging in a hybrid vehicle in accordance with one embodiment. Computing component 500 may be, for example, a server computer, a controller, or any other similar computing component capable of processing data. In the example implementation of FIG. 5, the computing component 500 includes a hardware processor, 502, and machine-readable storage medium, 504.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-510, to control processes or operations for generating the client device fingerprint model. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 502 may be a non-transitory storage medium, where the term "non-transitory" does not encompass transitory propagating signals. As described in detail below, machine-readable storage medium 502 may be encoded with executable instructions, for example, instructions 506-510.

Hardware processor 502 may execute instruction 506 to perform a first comparison of a state-of-charge of the battery 104 to a charge threshold, for example as described above.

Hardware processor 502 may execute instruction 508 to perform a second comparison of one or more current vehicle operating conditions to respective nominal vehicle operating conditions, wherein none of the vehicle operating conditions describe a condition of the battery 104. The vehicle operating conditions may be as described above.

Hardware processor 502 may execute instruction 510 to reduce charging of the battery 104 based on the first comparison and the second comparison. Reducing charging of the battery may be as described above.

Figure 6:
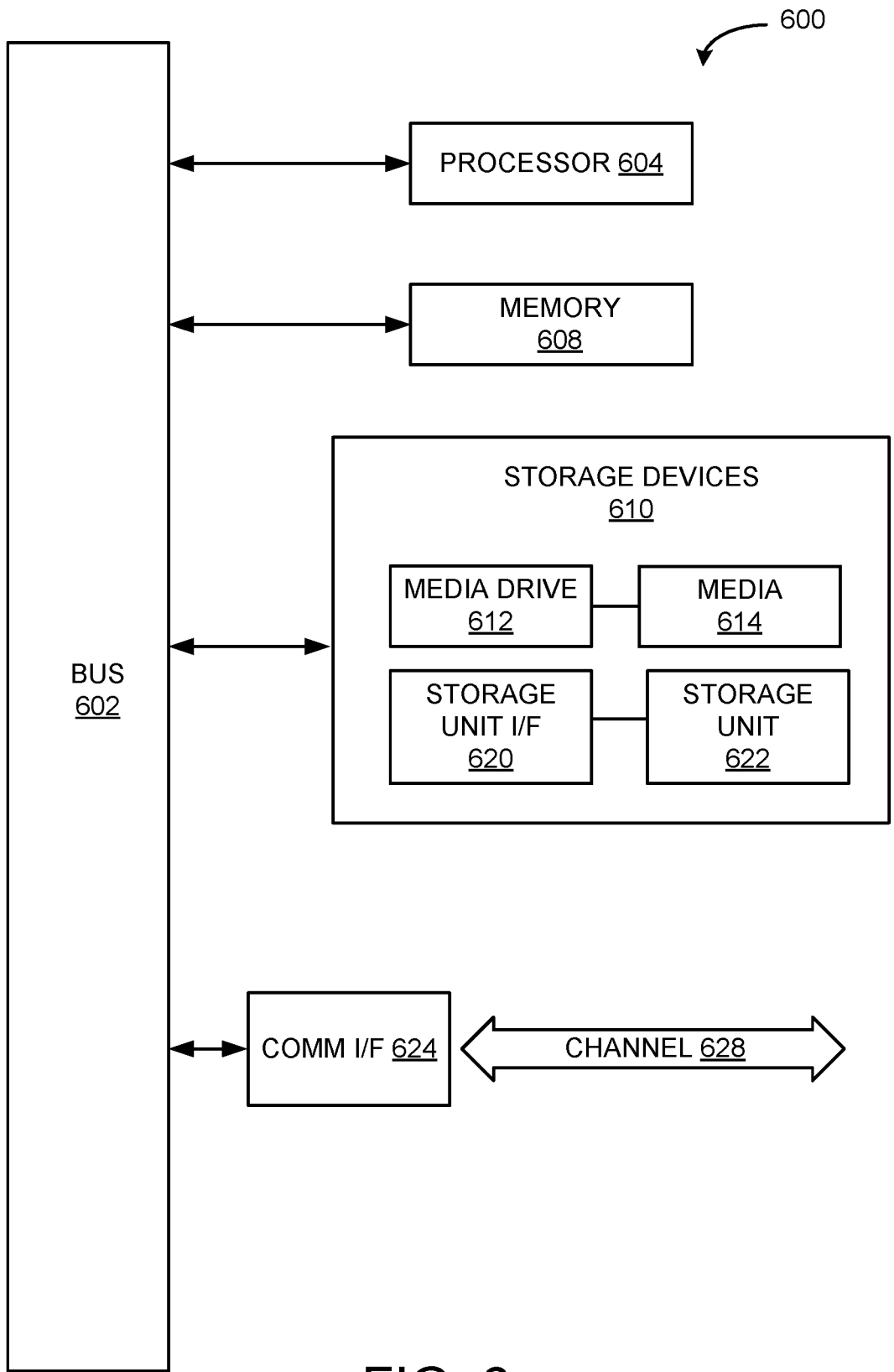
FIG. 6 shows an example computing component capable of carrying out the functionality described with respect thereto.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up hybrid vehicle 102 and its component parts, for example such as the computing component. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "machine-readable storage medium," "computer program medium," and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A hybrid electric vehicle, comprising:
    an internal combustion engine;
    an electric motor;
    a battery electrically coupled to the electric motor;
    a battery charger electrically coupled to the battery and mechanically coupled to the internal combustion engine;
    one or more sensors, wherein each sensor provides a respective sensor signal, wherein each sensor signal represents a respective current vehicle operating condition of the hybrid electric vehicle; and
    a computing component configured to:
        perform a first comparison of a state-of-charge of the battery to a charge threshold,
        perform a second comparison of at least one of the current vehicle operating conditions to respective nominal vehicle operating conditions, wherein none of the vehicle operating conditions describe a condition of the battery, and
        prevent excess heat generation by the hybrid electric vehicle by reducing charging of the battery based on the first comparison and the second comparison.

2. The hybrid electric vehicle of claim 1, wherein the computing component is further configured to:
reduce charging of the battery responsive to (i) the state-of-charge of the battery being below a charge threshold, and (ii) one or more of the current vehicle operating conditions being outside a normal range.

3. The hybrid electric vehicle of claim 1, wherein the second comparison comprises:
comparing the at least one of the current vehicle operating conditions to one or more respective vehicle operating conditions thresholds.

4. The hybrid electric vehicle of claim 3, wherein the at least one of the current vehicle operating conditions comprise:
an ambient temperature near the hybrid electric vehicle;
a throttle angle of an internal combustion engine of the hybrid electric vehicle;
a temperature of the internal combustion engine;
a temperature of a transmission of the hybrid electric vehicle;
a load of the internal combustion engine; and
a road grade encountered by the hybrid electric vehicle.

5. The hybrid electric vehicle of claim 2, wherein the second comparison comprises:
determining whether the vehicle is in a tow mode.

6. The hybrid electric vehicle of claim 1, wherein, to reduce charging of the battery, the computing component is further configured to at least one of:
reduce a target state of charge;
reduce a time of charging the battery;
reduce a number of charging intervals of the battery;
reduce a length of the charging intervals of the battery;
reduce a rate of charging the battery; and
reduce a minimum charge threshold.

7. The hybrid electric vehicle of claim 2, wherein the computing component is further configured to:
performing a third comparison of one of the current vehicle operating conditions to a plurality of vehicle operating conditions thresholds;
selecting one of a plurality of charging modes based on the third comparison; and
reducing charging of the battery according to the selected charging mode.

8. A non-transitory machine-readable storage medium encoded with instructions executable by a hardware processor of a computing component of a hybrid vehicle, the machine-readable storage medium comprising instructions to cause the hardware processor to:
perform a first comparison of a state-of-charge of a battery of the hybrid vehicle to a charge threshold;
perform a second comparison of one or more current vehicle operating conditions to respective nominal vehicle operating conditions, wherein none of the vehicle operating conditions describe a condition of the battery; and
prevent excess heat generation by the hybrid vehicle by reducing charging of the battery based on the first comparison and the second comparison.

9. The non-transitory machine-readable storage medium of claim 8, further comprising:
reducing charging of the battery responsive to (i) the state-of-charge of the battery being below a charge threshold, and (ii) one or more of the current vehicle operating conditions being outside a normal range.

10. The non-transitory machine-readable storage medium of claim 9, wherein the second comparison comprises:
comparing the one or more current vehicle operating conditions to one or more respective vehicle operating conditions thresholds.

11. The non-transitory machine-readable storage medium of claim 10, wherein at least one of the current vehicle operating conditions comprise:
an ambient temperature near the hybrid electric vehicle;
a throttle angle of an internal combustion engine of the hybrid electric vehicle;
a temperature of the internal combustion engine;
a temperature of a transmission of the hybrid electric vehicle;
a load of the internal combustion engine; and
a road grade encountered by the hybrid electric vehicle.

12. The non-transitory machine-readable storage medium of claim 9, wherein the second comparison comprises:
determining whether the vehicle is in a tow mode.

13. The non-transitory machine-readable storage medium of claim 9, wherein reducing charging of the battery comprises at least one of:
reducing a target state of charge;
reducing a time of charging the battery;
reducing a number of charging intervals of the battery;
reducing a length of the charging intervals of the battery;
reducing a rate of charging the battery; and
reducing a minimum charge threshold.

14. The non-transitory machine-readable storage medium of claim 9, further comprising:
performing a third comparison of one of the current vehicle operating conditions to a plurality of vehicle operating conditions thresholds;
selecting one of a plurality of charging modes based on the third comparison; and
reducing charging of the battery according to the selected charging mode.

15. A method for a hybrid electric vehicle, comprising:
performing a first comparison of a state-of-charge of a battery of the hybrid vehicle to a charge threshold;
performing a second comparison of one or more current vehicle operating conditions to respective nominal vehicle operating conditions, wherein none of the vehicle operating conditions describe a condition of the battery; and
preventing excess heat generation by the hybrid electric vehicle by reducing charging of the battery based on the first comparison and the second comparison.

16. The method of claim 15, further comprising:
reducing charging of the battery responsive to (i) the state-of-charge of the battery being below a charge threshold, and (ii) one or more of the current vehicle operating conditions being outside a normal range.

17. The method of claim 16, wherein the second comparison comprises:
comparing the one or more current vehicle operating conditions to one or more respective vehicle operating conditions thresholds.

18. The method of claim 17, wherein the at least one of the current vehicle operating conditions comprise:
an ambient temperature near the hybrid electric vehicle;
a throttle angle of an internal combustion engine of the hybrid electric vehicle;
a temperature of the internal combustion engine;
a temperature of a transmission of the hybrid electric vehicle;
a load of the internal combustion engine; and
a road grade encountered by the hybrid electric vehicle.

19. The method of claim 17, wherein the second comparison comprises:
determining whether the vehicle is in a tow mode.

20. The method of claim 17, wherein reducing charging of the battery comprises at least one of:
reducing a target state of charge;
reducing a time of charging the battery;
reducing a number of charging intervals of the battery;
reducing a length of the charging intervals of the battery;
reducing a rate of charging the battery; and
reducing a minimum charge threshold.

21. The method of claim 17, further comprising:
performing a third comparison of one of the current vehicle operating conditions to a plurality of vehicle operating conditions thresholds;
selecting one of a plurality of charging modes based on the third comparison; and
reducing charging of the battery according to the selected charging mode.

* * * * *